United States Patent Office 3,117,935
Patented Jan. 14, 1964

3,117,935
FERROMAGNETIC MATERIAL
Poul Bernard Braun and Wim Kwestroo, Eindhoven, Netherlands, assignors to North American Philips Company Inc., New York, N.Y., a corporation of Delaware
No Drawing. Filed June 6, 1961, Ser. No. 115,084
Claims priority, application Netherlands June 23, 1960
5 Claims. (Cl. 252—62.5)

The invention relates to a ferromagnetic material, in particular for use in magnet cores for high-frequency systems.

In the system $CaO$—$Fe_2O_3$ several compounds are known, for example, the compounds $CaFe_2O_4$, $Ca_2Fe_2O_5$ and $CaFe_4O_7$, which are not ferromagnetic. From "Journal of the American Chemical Society," vol. 81, No. 15, page 3842 (1959), it is known that by the reaction of $Fe_2O_3$ in a melt af $CaCl_2$ two phases were obtained, i.e., weakly ferromagnetic needles and prisms, which proved to have the crystal structure and the composition of $CaFe_2O_4$, and hexagonal transparent plates having a composition $Ca_2Fe_{10}O_{17}$. These plates were sufficiently ferromagnetic for them to be separated from the first fraction. The compound was hexagonal and looked very similar to magneto-plumbite. In "Nature," vol. 185, No. 4713, page 604 (1960), the compound $3CaO.FeO.7Fe_2O_3$ or $Ca_3Fe^{2+}Fe_{14}^{3+}O_{25}$ is referred to, which is non-magnetic.

The material according to the invention consists of mixed crystals of compounds having a chemical composition according to the formula

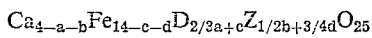

where D is at least one of the metals Y, Nb, Sm, Eu, Gd, Tb, Dy, Ho, Tm, Er, Yb, Lu, Bi and In, Z is at least one of the metals Th and Ce and in which $$0 \leq a \leq 0.7$$
$$0 \leq b \leq 0.5$$
$$0 \leq c \leq 0.7$$
$$0 \leq d \leq 0.5$$
$$a+b+c+d > 0$$

which have a rhombohedral crystal structure, the unit cell of which can be described in the hexagonal crystal system by a c-axis of about 95.0 A. and an a-axis of about 6.0 A.

In the crystals of the materials according to the invention, the spontaneous magnetization extends at right angles to the hexagonal axis and hence parallel to basal plane of the crystal. Thus, the crystal has a so-called preferred plane of magnetization. In this plane, the direction of magnetization is far more readily rotatable than in a direction not situated in this plane. Consequently, the materials have soft-magnetic properties. The initial permeability has values which are sufficiently high for them to be of interest for use in electrical technology.

The metals represented by D have the common property that the radius of their trivalent ions lies between 0.92 A. and 1.15 A. Similarly, Th and Ce have the property that the radius of their tetravalent ions lies between 0.92 A. and 1.15 A.

The materials according to the invention may be produced by heating a correctly proportioned, finely powdered mixture of the constituent metal oxides to a temperature between about 1100° C. and 1240° C., preferably between 1170° C. and 1210° C. Obviously, one or more of the constituent metal oxides may be replaced entirely or in part by compounds which, when heated, are converted to metal oxides, for example carbonates, oxalates and acetates. Furthermore, the constituent metal oxides may be replaced entirely or in part by at least one reaction product of at least two or the constituent metal oxides, for example $CaFe_2O_4$. The term "correctly proportioned" is to be understood to signify that the proportions of the amounts of the metals in the initial mixture are substantially equal to those in the compounds to be produced.

If desired, the finely powdered starting mixture may first be presintered at a comparatively low temperature (800° C.–1100° C.), the reaction product being ground and the resulting powder being sintered again, and this sequence of operations may be repeated once or several times. In order to promote sintering, sintering agents, such as silicates and fluorides, may be added.

Bodies consisting of the ferromagnetic materials described may be obtained by sintering the starting mixture of the metal oxides or the like immediately in the desired shape, and also by pulverizing the reaction product of the presintering process, the resulting powder, if required after the addition of the binder, being shaped in the required form and sintered.

It will be clear that in the method described small amounts of impurities may readily be incorporated in the reaction product. Examples of these impurities are $Fe_2O_3$, $CaFe_2O_4$ and compounds having garnet structure.

Obviously, single crystals of the materials according to the invention may also be produced. In view of the incongruous melting points of the materials, one starts from a mixture having a composition different from that of the desired compound, that is to say, from a composition which is richer in CaO by 15 to 20 mol percent. The mixture is heated to a temperature such that it is entirely melted (1240° C.–1280° C.). During subsequent slow cooling, single crystals of the relevant compound are formed. Preferably, cooling through the first 50° takes at least 2 hours.

It should be noted that, apart from the difference in composition, there are two more differences between the materials according to the invention and the compounds $Ca_3Fe^{2+}Fe_{14}^{3+}O_{25}$ known from "Nature," vol. 185, No. 4713, page 604 (1960). Firstly, the new materials are ferromagnetic, whereas the known material is stated to be non-magnetic, and secondly the new materials have a rhombohedral crystal structure the unit cell of which can be described in the hexagonal system by a c-axis of about 95.0 A. and an a-axis of about 6.0 A., whereas experiments have shown that the known material has a hexagonal crystal structure the unit cell of which can be described by a c-axis of about 31.5 A. and an a-axis of about 6.0 A.

EXAMPLE I

A mixture of $CaCO_3$, $Fe_2O_3$ and $Y_2O_3$ having a composition according to the formula $Ca_4Fe_{13.4}Y_{0.6}O_{25}$ was mixed with ethyl alcohol in a ball mill for 3 hours. After drying, the mixture was pre-fired in air at 800° C. for 16 hours, the reaction product then being ground with ethyl alcohol in a ball mill for 1½ hours. After drying, a small amount of a solution of an organic binder, nitrocellulose, was added to the product, which was then compressed to form rings, which were fired in oxygen at 1190° C. for 4 hours. X-ray examination showed that the rings consisted substantially entirely of crystals having the desired structure. For this compound $a=0$; $b=0$; $c=0.6$; $d=0$; while D represents the metal Y.

Rings having different compositions were made in the same manner, and X-ray examination showed that they all consisted substantially entirely of crystals having the desired structure. The starting mixtures consisted of $CaCO_3$, $Fe_2O_3$ and $In_2O_3$ having a composition according to the formula

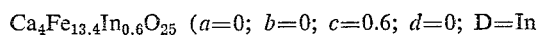

$CaCO_3$, $Fe_2O_3$ and $Gd_2O_3$ having a composition according to the formula $Ca_4Fe_{13.4}Gd_{0.6}O_{25}$ ($a=0$; $b=0$; $c=0.6$; $d=0$; $D=Gd$)

$CaCO_3$, $Fe_2O_3$ and $Nd_2O_3$ having a composition according to the formula $Ca_{3.4}Fe_{13.9}Nd_{0.5}O_{25}$ ($a=0.6$; $b=0$; $c=0.1$; $d=0$; $D=Nd$)

$CaCO_3$, $Fe_2O_3$ and $ThO_2$ having a composition according to the formula $Ca_{3.6}Fe_{13.6}Th_{0.5}O_{25}$ ($a=0$; $b=0.4$; $c=0$; $d=0.4$; $Z=Th$)

$CaCO_3$, $Fe_2O_3$ and $CeO_2$ having a composition according to the formula $Ca_{3.6}Fe_{13.6}Ce_{0.5}O_{25}$ ($a=0$; $b=0.4$; $c=0$; $d=0.4$; $Z=Ce$)

$CaO$, $Fe_2O_3$ and $Bi_2O_3$ having a composition according to the formula $Ca_{3.6}Fe_{13.7}Bi_{0.6}O_{25}$ ($a=0.4$; $b=0$; $c=0.3$; $d=0$; $D=Bi$)

In the last case, the rings were not fired at 1190° C. but at 1140° C.

A number of properties of these rings were measured. The following table shows the resistivity expressed in $\Omega$ cm. and the initial permeability and the loss factor tan $\delta$ at various frequencies. Owing to the electro-magnetic losses, there is a phase difference between the field strength and the induction. Therefore, the initial permeability is usually represented as a complex quantity. The table gives the value of the real part $\mu'$ of the initial permeability. The loss factor tan $\delta$ is equal to an $\mu''/\mu'$ where $\mu''$ is the imaginary part of the initial permeability.

*Table*

|  | $\rho$, $\Omega$ cm. | 1 mc./s. | | 5 mc./s. | | 70 mc./s. | | 100 mc./s. | |
|---|---|---|---|---|---|---|---|---|---|
|  |  | $\mu'$ | tan $\delta$ | $\mu'$ | tan $\delta$ | $\mu'$ | tan $\delta$ | $\mu'$ | tan $\delta$ |
| $Ca_4Fe_{13.4}Y_{0.6}O_{25}$ | $1.5\times10^7$ | 16.5 | 0.03 | 19.6 | 0.25 | 8.9 | 0.27 | 8.3 | 0.35 |
| $Ca_4Fe_{13.4}In_{0.6}O_{25}$ | $3.9\times10^5$ | 21.3 | 0.09 | 21.4 | 0.31 | 9.5 | 0.43 | 8.6 | 0.51 |
| $Ca_4Fe_{13.4}Gd_{0.6}O_{25}$ | $3.7\times10^6$ | 13.3 | 0.03 | 14.0 | 0.24 | 6.5 | 0.27 | 6.4 | 0.35 |
| $Ca_{3.4}Fe_{13.9}Nd_{0.5}O_{25}$ | $1.8\times10^8$ | 25.0 | 0.05 | 26.5 | 0.25 | 12.5 | 0.50 | 10.8 | 0.62 |
| $Ca_{3.6}Fe_{13.6}Th_{0.5}O_{25}$ | $1.2\times10^7$ | 8.25 | 0.03 | 8.8 | 0.10 | 5.6 | 0.25 | 5.2 | 0.45 |
| $Ca_{3.6}Fe_{13.6}Ce_{0.5}O_{25}$ | $2.5\times10^6$ | 13.1 | 0.03 | 14.8 | 0.19 | 8.6 | 0.43 | 7.45 | 0.52 |
| $Ca_{3.6}Fe_{13.7}Bi_{0.6}O_{25}$ | $5\times10^5$ | 26.9 | 0.06 | 27.2 | 0.33 | 10.1 | 0.63 | 8.6 | 0.73 |

EXAMPLE II

A mixture of 12.5 g. of $CaCO_3$, 2.11 g. of $Y_2O_3$ and 28.8 g. of $Fe_2O_3$ (corresponding to 40 mol percent of $CaO$, 2 mol percent of $Y_2O_3$ and 58 mol percent of $Fe_2O_3$) was heated in a platinum crucible in an oxygen atmosphere. The mixture began to melt at about 1220° C. It was heated to 1280° C. and subsequently cooled slowly. Cooling to 1220° C. was performed in 3 hours and subsequent cooling to room temperature in 6 hours. A few crystals had formed, the composition of which was determined by chemical analysis and the structure by X-ray examination. The crystal structure was rhombohedral and the unit cell could be described in the hexagonal crystal system by a c-axis of about 95.0 A. and an a-axis of about 6.0 a. The crystals proved to be single crystals of the compound $Ca_{3.5}Y_{0.7}Fe_{13.6}O_{25}$ ($a=0.5$; $b=0$; $c=0.4$; $d=0$; $D=Y$)

Starting from a mixture of 25 g. of $CaCO_3$, 58.4 g. of $Fe_2O_3$, 2.64 g. of $ThO_2$ and 1.4 g. of $In_2O_3$ (corresponding to 39 mol percent of $CaO$, 58 mol percent of $Fe_2O_3$, 2 mol percent of $ThO_2$ and 1 mol percent of $In_2O_3$) crystals having a composition $Ca_{4.0}Fe_{13.8}In_{0.1}Th_{0.1}O_{25}$
($a=0$; $b=0$; $c=0.1$; $d=0.1$; $D=In$; $Z=Th$)

were made in the same manner.

Starting from a mixture of 25 g. of $CaCO_3$, 58.4 g. of $Fe_2O_3$ and 5.28 g. of $ThO_2$ (corresponding to 39 mol percent of $CaO$, 58 mol percent of $Fe_2O_3$ and 3 mol percent of $ThO_2$) crystals having a composition $Ca_{4.0}Fe_{13.8}Th_{0.15}O_{25}$ ($a=0$; $b=0$; $c=0$; $d=0.2$; $Z=Th$)

were made in the same manner.

The saturation magnetization of all these crystals was 22 gauss. cc./g. at room temperature, while the Curie temperature was 150° C.

What is claimed is:

1. A ferromagnetic material consisting essentially of mixed crystals of compounds having a chemical composition according to the formula $Ca_{4-a-b}Fe_{14-c-d}D_{2/3a+c}Z_{1/2b+3/4d}O_{25}$ where D is at least one metal selected from the group consisting of Y, Nd, Sm, Eu, Gd, Tb, Dy, Ho, Tm, Er, Yb, Lu, Bi and In, Z is at least one metal selected from the group consisting of Th and Ce and where $0 \leq a \leq 0.7$
$0 \leq b \leq 0.5$
$0 \leq c \leq 0.7$
$0 \leq d \leq 0.5$
$a+b+c+d$ is at least 0.6 said mixed crystals having a rhombohedral crystal structure the unit cell of which can be described in the hexagonal crystal system by a c-axis of about 95.0 A. and an a-axis of about 6.0 A.

2. A method of producing a ferromagnetic material as defined in claim 1 in which a mixture of oxides of said metals in proportions corresponding approximately to those in said formula and in finely-divided form are heated to a temperature of about 1100° C. to 1240° C. to form said composition.

3. A method of producing a single crystal consisting essentially of a ferromagnetic material as defined in claim 1 in which a mixture having a composition corresponding to that of said material and an excess of about 15 to 20 mol percent of $CaO$ is heated to a temperature of about 1240° C. to 1280° C. and subsequently slowly cooled.

4. A method of producing a ferromagnetic material as defined in claim 2 in which the mixture is heated between about 1170° C. and 1210° C.

5. A method of producing a single crystal of ferromagnetic material as defined in claim 4 in which the material, after heating, is cooled 50° in at least two hours.

References Cited in the file of this patent

UNITED STATES PATENTS 1,946,964    Cobb                      Feb. 13, 1934